US012679357B2

(12) United States Patent
Resch

(10) Patent No.: US 12,679,357 B2
(45) Date of Patent: Jul. 14, 2026

(54) METHOD FOR ASSISTING A USER OF A VEHICLE DURING AN AUTOMATED TRANSVERSE GUIDANCE OF THE VEHICLE ON A ROAD HAVING A BRANCH TAKING INTO ACCOUNT A PRECEDING VEHICLE, COMPUTING DEVICE AND DRIVER ASSISTANCE SYSTEM

(71) Applicant: Bayerische Motoren Werke Aktiengesellschaft, Munich (DE)

(72) Inventor: Christoph Resch, Obernzell (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 18/832,980

(22) PCT Filed: Jan. 17, 2023

(86) PCT No.: PCT/EP2023/050966
§ 371 (c)(1),
(2) Date: Jul. 25, 2024

(87) PCT Pub. No.: WO2023/143961
PCT Pub. Date: Aug. 3, 2023

(65) Prior Publication Data
US 2025/0100551 A1 Mar. 27, 2025

(30) Foreign Application Priority Data
Jan. 31, 2022 (DE) ..................... 10 2022 102 202.1

(51) Int. Cl.
*B60W 30/12* (2020.01)
*B60W 30/18* (2012.01)
(Continued)

(52) U.S. Cl.
CPC ...... *B60W 30/12* (2013.01); *B60W 30/18163* (2013.01); *B60W 40/08* (2013.01);
(Continued)

(58) Field of Classification Search
CPC ........... B60W 30/12; B60W 30/18163; B60W 40/08; B60W 50/14; B60W 2040/0881;
(Continued)

(56) References Cited

U.S. PATENT DOCUMENTS

| | | |
|---|---|---|
| 6,577,334 B1 | 6/2003 | Kawai et al. |
| 9,709,406 B2 | 7/2017 | Bastiaensen et al. |

(Continued)

FOREIGN PATENT DOCUMENTS

| | | |
|---|---|---|
| CN | 110060493 B | 11/2020 |
| DE | 199 06 614 A1 | 10/1999 |

(Continued)

OTHER PUBLICATIONS

International Search Report (PCT/ISA/210) issued in PCT Application No. PCT/EP2023/050966 dated Apr. 24, 2023 with English translation (6 pages).

(Continued)

*Primary Examiner* — Ashley L Redhead, Jr.
(74) *Attorney, Agent, or Firm* — Crowell & Moring LLP

(57) ABSTRACT

A method for assisting a user of a vehicle during an automated lateral guidance of the vehicle on a road having multiple lanes includes determining map-based position data that describes a present position of the vehicle in relation to the lanes on the basis of satellite-based position data and high-resolution map data, receiving sensor data from an environment sensor of the vehicle, detecting a preceding vehicle and a trajectory taken by the preceding vehicle based on the sensor data, determining probabilities of occupancy for the vehicle for at least some of the lanes based on the
(Continued)

map-based position data and/or sensor data, recognizing a branch in the road based on the map-based position data and/or sensor data, and actuating an output device for outputting a takeover request before the branch is reached according to the probabilities of occupancy and the trajectory of the preceding vehicle.

17 Claims, 3 Drawing Sheets

(51) Int. Cl.
_B60W 40/08_ (2012.01)
_B60W 50/14_ (2020.01)

(52) U.S. Cl.
CPC ..... _B60W 50/14_ (2013.01); _B60W 2040/0881_ (2013.01); _B60W 2552/10_ (2020.02); _B60W 2554/4041_ (2020.02); _B60W 2556/50_ (2020.02)

(58) Field of Classification Search
CPC ..... B60W 2552/10; B60W 2554/4041; B60W 2556/50; B60W 2552/53; B60W 2556/40; B60W 60/0053; B62D 15/025; B62D 15/0255; B62D 1/286; G01C 21/30
See application file for complete search history.

(56) References Cited

U.S. PATENT DOCUMENTS

| | | | |
|---|---|---|---|
| 10,628,671 B2 | 4/2020 | Zang et al. | |
| 11,776,392 B2 | 10/2023 | Runemalm et al. | |
| 2015/0321665 A1 | 11/2015 | Pandita et al. | |
| 2017/0197634 A1 | 7/2017 | Sato | |
| 2018/0162396 A1* | 6/2018 | Ibuka | G08G 1/096775 |
| 2018/0170307 A1* | 6/2018 | Boran | B60R 21/01554 |
| 2018/0237007 A1 | 8/2018 | Adam et al. | |
| 2018/0329414 A1* | 11/2018 | Igarashi | B60W 50/082 |
| 2018/0357904 A1* | 12/2018 | Miyata | G08G 1/166 |
| 2019/0367034 A1 | 12/2019 | Okajima et al. | |
| 2020/0116499 A1 | 4/2020 | Jung et al. | |
| 2020/0118426 A1 | 4/2020 | Runemalm et al. | |
| 2020/0207355 A1 | 7/2020 | Ishioka et al. | |
| 2021/0174668 A1* | 6/2021 | Sun | G06N 3/0464 |
| 2021/0284149 A1 | 9/2021 | Kato | |
| 2023/0271608 A1 | 8/2023 | De Bruin et al. | |

FOREIGN PATENT DOCUMENTS

| | | |
|---|---|---|
| DE | 10 2010 053 964 A1 | 8/2011 |
| DE | 10 2011 118 708 A1 | 5/2013 |
| DE | 10 2018 103 409 A1 | 8/2018 |
| DE | 10 2019 115 788 A1 | 12/2020 |
| DE | 10 2019 215 263 A1 | 4/2021 |
| DE | 10 2020 206 830 A1 | 12/2021 |
| DE | 10 2020 118 630 A1 | 1/2022 |
| EP | 3 901 826 A2 | 10/2021 |

OTHER PUBLICATIONS

German-language Written Opinion (PCT/ISA/237) issued in PCT Application No. PCT/EP2023/050966 dated Apr. 24, 2023 with English translation (9 pages).

German-language Search Report issued in German Application No. 10 2022 102 202.1 dated Oct. 17, 2022 with partial English translation (13 pages).

German-language Search Report issued in German Application No. 10 2022 102 201.3 dated Nov. 2, 2022 with partial English translation (12 pages).

U.S. Final Office Action issued in U.S. Appl. No. 18/833,126 dated Dec. 18, 2025 (9 pages).

International Search Report (PCT/ISA/210) issued in PCT Application No. PCT/EP2023/050963 dated Apr. 24, 2023 with English translation (8 pages).

German-language Written Opinion (PCT/ISA/237) issued in PCT Application No. PCT/EP2023/050963 dated Apr. 24, 2023 with English translation (10 pages).

German-language Search Report issued in German Application No. 10 2022 102 200.5 dated Oct. 17, 2022 with partial English translation (14 pages).

U.S. Non-Final Office Action issued in U.S. Appl. No. 18/833,126 dated Sep. 11, 2025 (16 pages).

* cited by examiner

METHOD FOR ASSISTING A USER OF A VEHICLE DURING AN AUTOMATED TRANSVERSE GUIDANCE OF THE VEHICLE ON A ROAD HAVING A BRANCH TAKING INTO ACCOUNT A PRECEDING VEHICLE, COMPUTING DEVICE AND DRIVER ASSISTANCE SYSTEM

BACKGROUND AND SUMMARY

The present invention relates to a method for assisting a user of a vehicle during an automated lateral guidance of the vehicle on a road having multiple lanes. Moreover, the present invention relates to a computing device for a driver assistance system of a vehicle. Also, the present invention relates to a driver assistance system having such a computing device. Finally, the present invention relates to a computer program.

The prior art discloses driver assistance systems that assist the user or driver of a vehicle in the lateral guidance of the vehicle. Such a driver assistance system, which can also be referred to as a lateral guidance system, can help to guide the vehicle within a lane and consequently to relieve the user of burden in the steering effort. These driver assistance systems can permit the user to take their hands off the steering wheel briefly. Such driver assistance systems are also referred to as hands-on systems.

Lateral guidance systems today are based, for example, on the sensor data from an environment sensor, in particular a camera, that describe the road markings of a lane. These sensor data can also be influenced by external environmental conditions, however. Variables derived from these sensor data, for example the lane curvature and/or the lane profile, are then susceptible to environmental influences, for example the low-lying sun or heavy rain. In the worst case, this can lead to the vehicle straying from the lane, today's lateral guidance systems being designed as hands-on systems and therefore being deemed safe despite this disadvantage.

Moreover, the prior art discloses that, in addition to the sensor data from the camera, or a front camera, sensor data from other environment sensors are also used. By way of example, the sensor data from a radar sensor can be taken into account in an applicable fusion concept.

For future lateral guidance systems that permit the user to adopt a constant hands-off mode, the quality of the lane information comprising the sensor data from at least one environment sensor is no longer adequate. The desired hands-off mode results in lower controllability for the user, meaning that the demands on a lane information recognition increase. For this reason, it is necessary for the lane information recognition to be improved and/or monitored on the basis of the sensor data from the environment sensors, in particular the detections of the traffic lane curvature and/or the traffic lane profile.

Moreover, the prior art discloses that the position of a vehicle can be determined on the basis of the data from a satellite-assisted position determination system and a high-resolution map. By way of example, the position of the vehicle can thus be determined with lane accuracy, or in relation to one lane of the road. Even with this map-based position determination, applicable variances and errors can arise during operation of the lateral guidance system.

It is an object of the present invention to demonstrate a solution with regard to how a user of a vehicle can be assisted reliably and more safely during an automated lateral guidance of the vehicle.

This object is achieved according to the invention by a method, by a computing device, by a driver assistance system and by a computer program having the features according to the present disclosure. Advantageous developments are also specified in the present disclosure.

An inventive method is used to assist a user of a vehicle during an automated lateral guidance of the vehicle on a road having multiple lanes. The method comprises receiving satellite-based position data and high-resolution map data. Moreover, the method comprises determining map-based position data that describe a present position of the vehicle in relation to the lanes on the basis of the satellite-based position data and the high-resolution map data. In addition, the method comprises receiving sensor data from at least one environment sensor of the vehicle, the sensor data describing boundaries of the lanes. Additionally, the method comprises detecting a preceding vehicle and a trajectory taken by the preceding vehicle on the basis of the sensor data. Also, the method comprises determining probabilities of occupancy for the vehicle for at least some of the lanes on the basis of the map-based position data and/or the sensor data. Moreover, the method comprises recognition of a branch in the road on the basis of the map-based position data and/or the sensor data, the branch resulting in at least one of the lanes branching off from the other lanes. The method also comprises actuation of an output device for outputting a takeover request before the branch is reached according to the probabilities of occupancy and the trajectory of the preceding vehicle.

During the automated lateral guidance of the vehicle, a driver assistance system of the vehicle, which can also be referred to as a lateral guidance system, can be used to perform applicable steering interventions, with the result that the vehicle is maneuvered within a lane, or the traffic lane, of the road. By way of example, the vehicle can be maneuvered by the driver assistance system in such a way that it is kept central between the road markings of a lane. In particular, the user or driver of the vehicle can take their hands off the steering wheel continuously during the automated lateral guidance. The road is a road having at least two or more separate lanes, or traffic lanes. The road may be an urban road, a national road, a freeway-like road, a freeway or the like. Preferably, there is also provision for the driver assistance system of the vehicle to be able to be used to undertake an automated longitudinal guidance of the vehicle as well.

The method can be carried out using an applicable computing device of the vehicle, or of the driver assistance system. This computing device may be formed by at least one electronic control unit of the vehicle. This computing device can be used to receive the satellite-based position data, which are provided for example using an applicable receiver for a satellite-assisted position determination system. The receiver can be used to receive position data from a global navigation satellite system (GNSS). In particular, a so-called differential global positioning system is used, which can improve the accuracy of the position determination, or of the GNSS navigation, by transmitting correction data.

Moreover, high-resolution map data, or high-precision map data, or HD maps, are used to be able to determine the present position of the vehicle. These high-resolution map data can be received by the computing device. The high-resolution map data may be stored in a memory, or a storage device, of the driver assistance system and/or can be received by an external computing device. The satellite-based position data and the high-resolution map data can then be taken as a basis for determining the map-based position data. The satellite-based position data and/or the map-based position data can be determined with reference to a world coordinate system. The map-based position data describe the present position of the vehicle in relation to one lane from the multiple lanes. The position of the vehicle can thus be ascertained with lane accuracy. The term "with lane accuracy" is intended to be understood in the present case to mean that, given multiple lanes, that lane from the multiple lanes that the vehicle is currently in is ascertained.

Moreover, the computing device can be used to receive the sensor data. These sensor data originate from at least one environment sensor of the vehicle, or of the driver assistance system. The environment sensor may be in particular a camera, or a front camera, of the driver assistance system. These sensor data, which are provided using the environment sensor, or the camera, describe the boundary or boundaries of at least one of the lanes. The boundaries may be in particular road markings. The respective road markings are used to bound the lanes. The boundary of a lane may also be a structural boundary. The boundary of the lane may also be turf or the like.

The recognized boundaries, or road markings, can be taken as a basis for determining the present position of the vehicle in relation to these boundaries, or road markings. The sensor data can be taken as a basis for ascertaining the position of the vehicle within the lane. There may furthermore be provision for the data from other environment sensors, for example radar sensors, lidar sensors or the like, to be used and to be fused with the sensor data from the camera in order to determine the position of the vehicle. The sensor data from the other environment sensors may also describe other road users in the lanes.

In addition, there is provision for a probability of occupancy to be determined for at least some of the lanes of the road. Preferably, that lane from the multiple lanes with the highest probability of occupancy is determined. The probability of occupancy describes in particular the probability of the vehicle being in the lane. The probability of occupancy pertaining to the vehicle can be ascertained on the basis of the map-based position data. Alternatively or additionally, there may be provision for the probability of occupancy pertaining to the vehicle to be ascertained for the lanes on the basis of the sensor data.

In addition, the sensor data are taken as a basis for detecting the preceding vehicle. The preceding vehicle may be in particular another road user, or another vehicle. The preceding vehicle may be in front of the vehicle, or ego vehicle, in the direction of travel, or forward direction. In particular, the preceding vehicle may be in the same lane as the vehicle. Firstly, the sensor data, or image data, from the camera are taken as a basis for detecting that there is a preceding vehicle. Secondly, the sensor data are taken as a basis for determining the trajectory, or path of movement, or a driving path. The trajectory describes in particular the route traveled or taken by the preceding vehicle. The trajectory can be determined by using the environment sensor, or the camera, to capture the sensor data at successive times.

Moreover, there is provision for the map-based position data and/or the sensor data to be taken as a basis for recognizing a branch or fork in the lanes. The term "branch" is intended to be understood in the present case to mean in particular that a lane guidance of at least one branching lane differs from the lane guidance of the other lanes. The branch may be in particular a freeway fork or the like. The at least one branching lane assigned to the branch thus in particular does not run parallel to the other lanes. This fork, or branch, in the lanes can be recognized on the basis of the map-based position data. The branch can thus be recognized on the basis of the satellite-based position data and the high-resolution map data. Alternatively or additionally, there may be provision for the branch to be recognized by also using the sensor data.

According to the present invention, allowance is made for the information from the high-precision map and at the same time also the information from the at least one environment sensor to be able to be incorrect, or erroneous. This can lead, for example in the region of the branch, to the sensor data and the high-precision map data being taken as a basis for assuming that the vehicle is in a non-branching lane, even though the vehicle is actually in a branching lane. This error is expected very rarely, but fails to meet the customer demands on a hands-off function.

If there is a preceding vehicle, firstly the probabilities of occupancy for the lanes and secondly the trajectory of the preceding vehicle are examined. The output device is then actuated according to this examination. This output device is used to output the takeover request to the user, or driver. The takeover request can be output before the vehicle has reached the branch, or a predetermined distance from the branch. This takeover request can result in the user being asked to manually take the wheel of the vehicle again. The user may also be asked to take their hands back to the steering wheel. During the automated lateral guidance of the vehicle, there is in particular provision for the driver to be able to take their hands off the steering wheel. A so-called hands-off function is thus provided, in particular. The takeover request can also be used to deactivate this hands-off function again.

By way of example, the takeover request can be output if, on the basis of the probabilities of occupancy, it is not possible to determine precisely or with sufficient certainty which lane the vehicle is currently in. This applies in particular if it is not possible to reliably determine whether the vehicle is in the branching lane or the non-branching lane. In the present case, not only detected road markings and the high-precision map data but also the movement of the preceding vehicle are taken into consideration. It is thus possible to ensure road traffic safety in that region of the branch in which erroneous map-based position data and/or erroneous sensor data can result in the threat of the vehicle straying from the lane.

Preferably, the actuation of the output device is verified on the basis of the trajectory of the preceding vehicle if an actuation of the output device for outputting the takeover request is planned on the basis of the probabilities of occupancy. It may thus be the case that, on the basis of the evaluation of the probabilities of occupancy, the takeover request is supposed to be output and/or the hands-off function is supposed to be deactivated. One aim during the operation of the driver assistance system, however, is to maintain the hands-off function, or to avoid deactivating the function. The trajectory of the preceding vehicle can therefore be taken as a basis for checking whether output of the takeover request, or deactivation of the function, is actually necessary.

If, for example, on the basis of the probabilities of occupancy, it is not possible to reliably ascertain whether the vehicle is in the branching or the non-branching lane in the region of the exit, or before the exit is reached, the trajectory of the preceding vehicle can be used. If the preceding vehicle, which is in the same lane as the ego vehicle and in front of the ego vehicle, is traveling straight ahead, it can be assumed that the vehicle is also in the parallel, or non-branching, lane. If, on the other hand, the trajectory of the preceding vehicle describes a predetermined steering movement, it can be assumed that the vehicle is in the non-parallel, or branching, lane.

In one embodiment, a path planning for a future lateral guidance of the vehicle is performed on the basis of the trajectory of the preceding vehicle if the verification results in the output device not being actuated. That is to say that if the preceding vehicle has been detected and the trajectory of the preceding vehicle has been determined, the future lateral guidance of the vehicle can be performed on the basis of the trajectory of the preceding vehicle. This can be carried out in particular if the probabilities of occupancy for the lanes have previously been taken as a basis for deciding to output a takeover request and/or to deactivate the hands-off function.

If the probabilities of occupancy for the lanes have been taken as a basis for deciding that the automated lateral guidance of the vehicle can be continued, the path planning for a future lateral guidance of the vehicle can be performed (again) on the basis of the map-based position data and/or the sensor data. In particular, the future lateral guidance of the vehicle can be performed on the basis of map-based lane profile data and/or sensor-based lane profile data.

In particular, this is accomplished by determining the map-based lane profile data, which describe a future desired movement of the vehicle in relation to the lanes on the basis of the map-based position data. Moreover, there is preferably provision for sensor-based lane profile data that describe a future desired movement of the vehicle in relation to the lanes on the basis of the sensor data to be determined. The satellite-based position data and the high-resolution map data can be taken as a basis for ascertaining first the map-based position data and then the map-based lane profile data. The map-based lane profile data describe the future desired movement of the vehicle in relation to one lane from the multiple lanes of the road. The future lane profile of the vehicle can therefore be ascertained with lane accuracy, or in relation to one of the lanes. Furthermore, the sensor data can also be taken as a basis for determining the sensor-based lane profile data that describe the future desired movement of the vehicle.

As already explained, a probability of occupancy is determined for at least some of the lanes of the road. Preferably, that lane from the multiple lanes with the highest probability of occupancy is determined. It is thus possible to determine the lane that the vehicle is most probably in. The probability of occupancy for the at least one branching lane can also be determined.

In one embodiment, the actuation of the output device for outputting the takeover request is planned according to a situation of the lane with the highest probability of occupancy relative to the branch. It is thus possible to first determine the distance of the lane with the highest probability of occupancy from the branch. Here, the output device for outputting the takeover request can be actuated if the distance of the lane with the highest probability of occupancy from the at least one branching lane is below a predetermined minimum distance. That is to say that if for example it is recognized that the vehicle is most probably in one of the parallel lanes, or non-branching lanes, which, however, are adjacent to the branch, the takeover request can be output. The minimum distance may correspond to the width of one or two lanes. This means in particular that the takeover request can be output if the lane with the highest probability of occupancy is directly adjacent to the branch and/or is at a distance of one lane from the branch.

In another embodiment, the actuation of the output device for outputting the takeover request is planned according to a comparison of the highest probability of occupancy with a probability of occupancy pertaining to the at least one branching lane. Preferably, the output device for outputting the takeover request is actuated if a difference between the highest probability of occupancy and the probability of occupancy pertaining to the at least one branching lane is above a predetermined threshold value. That is to say that if it is detected that the difference between the highest probability of occupancy and the probability of occupancy pertaining to the at least one branching lane is relatively small, the takeover request can be output and/or the hands-off function can be deactivated. In this case, it is not possible to reliably determine whether the vehicle is in the lane with the highest probability of occupancy or the at least one branching lane.

There is also preferably provision for the map-based lane profile data and the sensor-based lane profile data to be compared with one another. Both the map-based lane profile data and the sensor-based lane profile data can describe the present and/or future movement of the vehicle. The future movement of the vehicle can be determined by also taking account of the present steering angle of the vehicle and/or planned steering interventions. The respective lane profile data can describe a trajectory and/or a driving path. If the sensor-based lane profile data differ from the map-based lane profile data, or if the difference between the sensor-based lane profile data and the map-based lane profile data is above a predetermined limit value, the output device for outputting the takeover request can be actuated.

Furthermore, it is advantageous if the probabilities of occupancy pertaining to the lanes next to the lane with the highest probability of occupancy are determined and the output device for outputting the takeover request is determined according to the respective probabilities of occupancy. Preferably, or depending on the processing power of the computing device, the probabilities of occupancy for each of the lanes of the road can also be determined. These individual probabilities of occupancy can then be taken as a basis for outputting the takeover request and/or for deactivating the hands-off function.

An inventive computing device for a driver assistance system of a vehicle is configured to carry out an inventive method and the advantageous refinements thereof. The computing device may be formed by at least one electronic control unit of the vehicle. In principle, the computing device may have at least one processor and/or a memory element.

An inventive driver assistance system for a vehicle comprises an inventive computing device. Moreover, the driver assistance system comprises an output device for outputting a takeover request to a user of the vehicle. This output device may be designed to output the takeover request to the user visually, audibly and/or haptically. In addition, the driver assistance system is configured to perform an automated lateral guidance of the vehicle.

The driver assistance system may have at least one environment sensor that can be used to provide the sensor data that describe the road markings, or boundaries. This environment sensor may preferably be in the form of a camera, or front camera. Moreover, the driver assistance system may have other environment sensors, which may be in the form of a radar sensor, a lidar sensor or the like, for example. Moreover, the driver assistance system may have a receiver for a satellite-assisted position determination system. Additionally, the driver assistance system may have a memory, or a storage device, that stores a high-resolution map, or a so-called HD map.

An inventive vehicle comprises an inventive driver assistance system. The vehicle is in particular in the form of a passenger vehicle.

Another aspect of the invention relates to a computer program comprising commands that, when the program is executed by a computing device, cause said computing device to carry out an inventive method and the advantageous refinements thereof. In addition, the invention relates to a computer-readable (storage) medium comprising commands that, when executed by a computing device, cause said computing device to carry out an inventive method and the advantageous refinements thereof.

The preferred embodiments presented with reference to the inventive method, and the advantages of said embodiments, apply mutatis mutandis to the inventive computing device, to the inventive driver assistance system, to the inventive vehicle, to the inventive computer program and to the inventive computer-readable (storage) medium.

Other features of the invention are obtained from the claims, the figures and the description of the figures. The features and combinations of features that are mentioned in the description hereinabove and the features and combinations of features that are mentioned in the description of the figures hereinbelow and/or shown in the figures alone can be used not only in the respectively indicated combination but also in other combinations or on their own without departing from the scope of the invention.

The invention will now be explained in more detail on the basis of preferred exemplary embodiments and with reference to the accompanying drawings.

DETAILED DESCRIPTION OF THE DRAWINGS

In the figures, identical or functionally identical elements are provided with the same reference signs.

Figure 1:
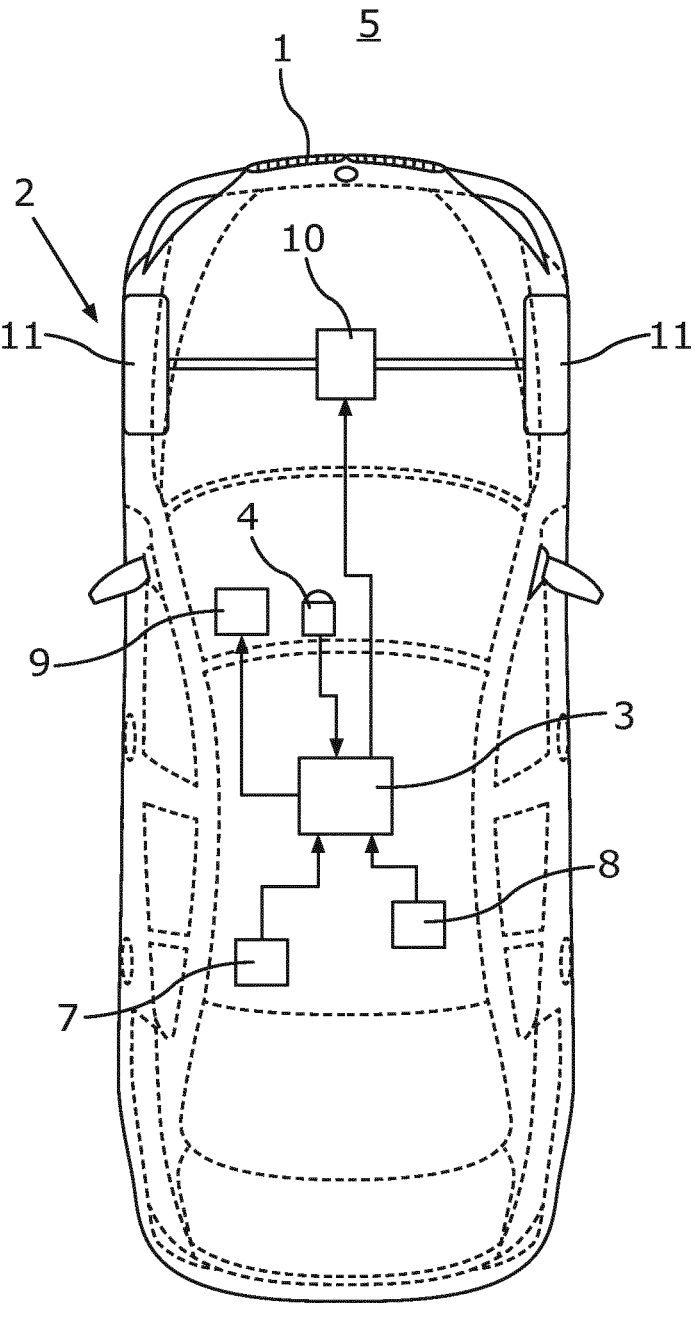
FIG. 1 shows a schematic representation of a vehicle that has a driver assistance system for assisting a user of the vehicle in a lateral guidance of the vehicle.

FIG. 1 shows a vehicle 1, which is in the form of a passenger vehicle in the present case, in a plan view. The vehicle 1 comprises a driver assistance system 2 that is configured to assist a user, or driver, of the vehicle 1 in a lateral guidance of the vehicle 1. In particular, the driver assistance system 2 is used to undertake an automated lateral guidance of the vehicle 1. Preferably, the driver assistance system 2 can undertake the lateral guidance in such a way that the user can take their hands off the steering wheel continuously.

The driver assistance system 2 comprises a computing device 3, which may be formed by at least one electronic control unit of the vehicle 1, for example. Moreover, the driver assistance system 2 comprises at least one environment sensor 4, which is in the form of a camera, or front camera, in the present case. The environment sensor 4 can be used to provide sensor data, or image data, that describe surroundings 5 of the vehicle 1. In particular, the sensor data, or image data, can describe boundaries of lanes 13, in particular road markings 6, of a road 12. The sensor data can be transmitted from the environment sensor 4, or the camera, to the computing device 3.

In addition, the driver assistance system 2 comprises a receiver 7 for a satellite-assisted position determination system. The receiver 7 can be used to determine satellite-based position data that describe the position of the vehicle 1. Moreover, the driver assistance system 2 comprises a storage device 8 that stores high-resolution map data, or so-called HD maps. Additionally, the driver assistance system 2 comprises an output device 9 that can be used to output an output to the user of the vehicle 1. This output can be output visually, audibly and/or haptically, in principle.

Moreover, the computing device 3 is configured to actuate a steering system 10 of the vehicle 1, which steering system is depicted only schematically in the present case. By actuating the steering system 10 it is possible to undertake the lateral guidance of the vehicle 1. Actuating the steering system 10 allows steerable wheels 11 of the vehicle 1 to be moved. Preferably, there is also provision for the computing device 3 to be able to be used to also actuate a drive motor and/or a braking system of the vehicle 1 in order to also undertake the longitudinal guidance of the vehicle 1.

Figure 2:
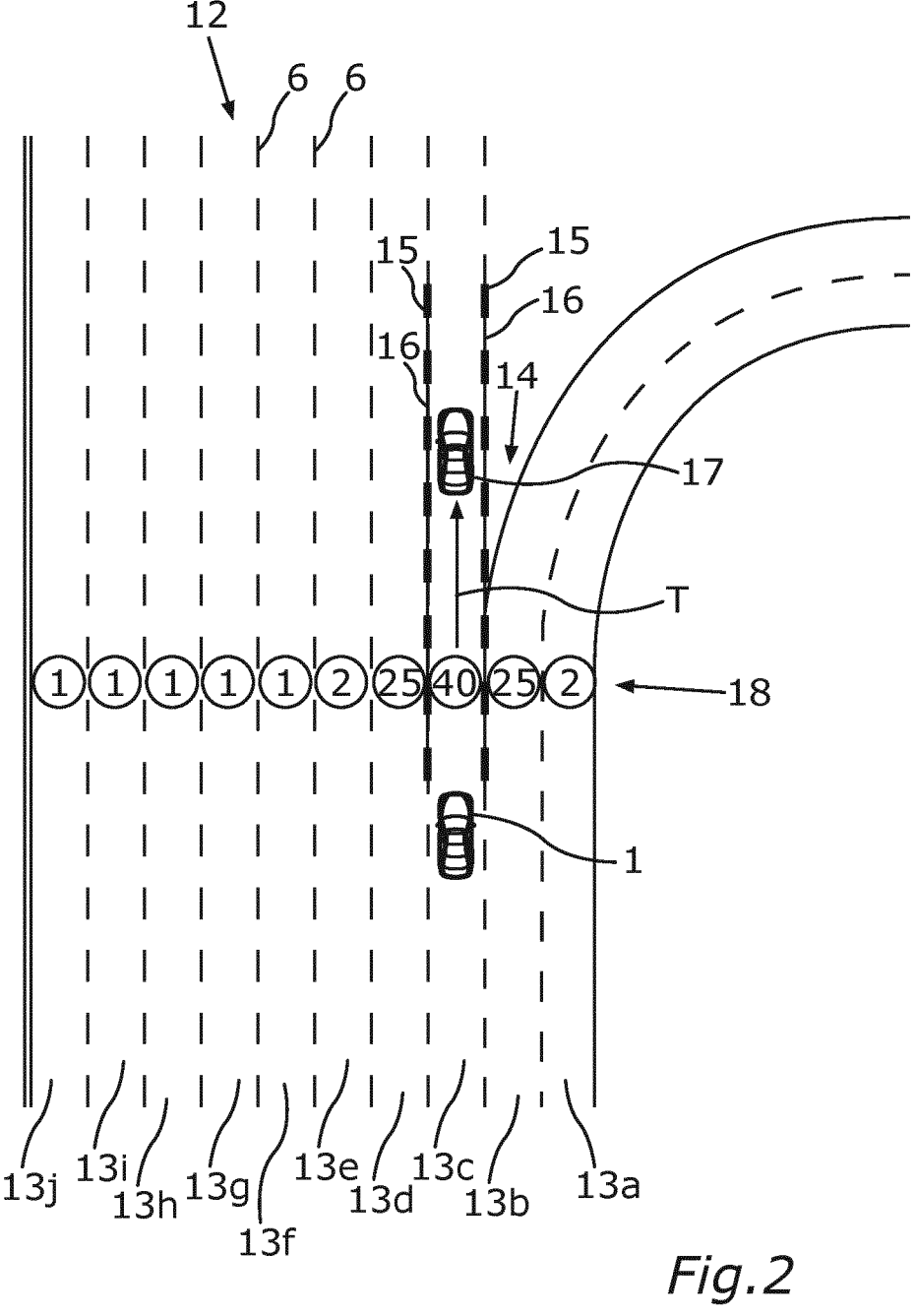
FIG. 2 shows a schematic representation of a road that comprises a plurality of lanes, and respective probabilities of occupancy for the lanes.

FIG. 2 shows a schematic representation of the vehicle 1, which is on a multilane road 12. The road 12 is in the form of a freeway in the present case and comprises ten lanes 13a to 13j, which are separated from one another by road markings 6. The multilane road 12 comprises a branch 14, or fork. This branch 14 results in the first lane 13a and the second lane 13b branching off from the other lanes 13c to 13j. The lanes 13a and 13b are referred to as branching lanes, or nonparallel lanes, hereinbelow. The lanes 13c to 13j run parallel, or in a first direction of travel. The lanes 13a and 13b run nonparallel to the other lanes 13c to 13j, or run in a second direction of travel.

Moreover, FIG. 2 shows a schematic representation of map-based lane profile data 15 that are determined on the basis of the satellite-based position data from the receiver 7 for the satellite-assisted position determination system and the high-resolution map data. The map-based lane profile data 15 can be taken as a basis for ascertaining the position, or the future desired movement, of the vehicle 1 within the lanes 13a to 13j.

Also, FIG. 2 shows a schematic representation of sensor-based lane profile data 16 that likewise describe the position, or the future desired movement, of the vehicle 1 in relation to the lanes 13a to 13j. These sensor-based lane profile data 16 are determined on the basis of the sensor data from the at least one environment sensor 4, or the camera. In the present case, the map-based lane profile data 15 and the sensor-based lane profile data 16 are each illustrated as trajectories.

Moreover, the respective lanes 13a to 13j in FIG. 2 are associated with probabilities of occupancy. The respective probabilities of occupancy describe the probability of the vehicle 1 being in the respective lanes 13a to 13j. In the present case, the respective probabilities of occupancy for the lanes 13a to 13j are indicated as a percentage in a region 18. In the example shown, the vehicle 1 has a probability of 40% of being in the third lane 13c, which is directly adjacent to the branch 14, or the two branching lanes 13a and 13b.

In the direction of travel in front of the vehicle 1 is a preceding vehicle 17 that is in the same lane 13c as the vehicle 1. The preceding vehicle 17 may likewise be a passenger vehicle. The preceding vehicle 17 can be sensed on the basis of the sensor data from the environment sensor 4. By way of example, multiple measurements at successive times using the environment sensor 4 can also be taken as a basis for determining a trajectory T of, or a route traveled by, the preceding vehicle 17.

Figure 3:
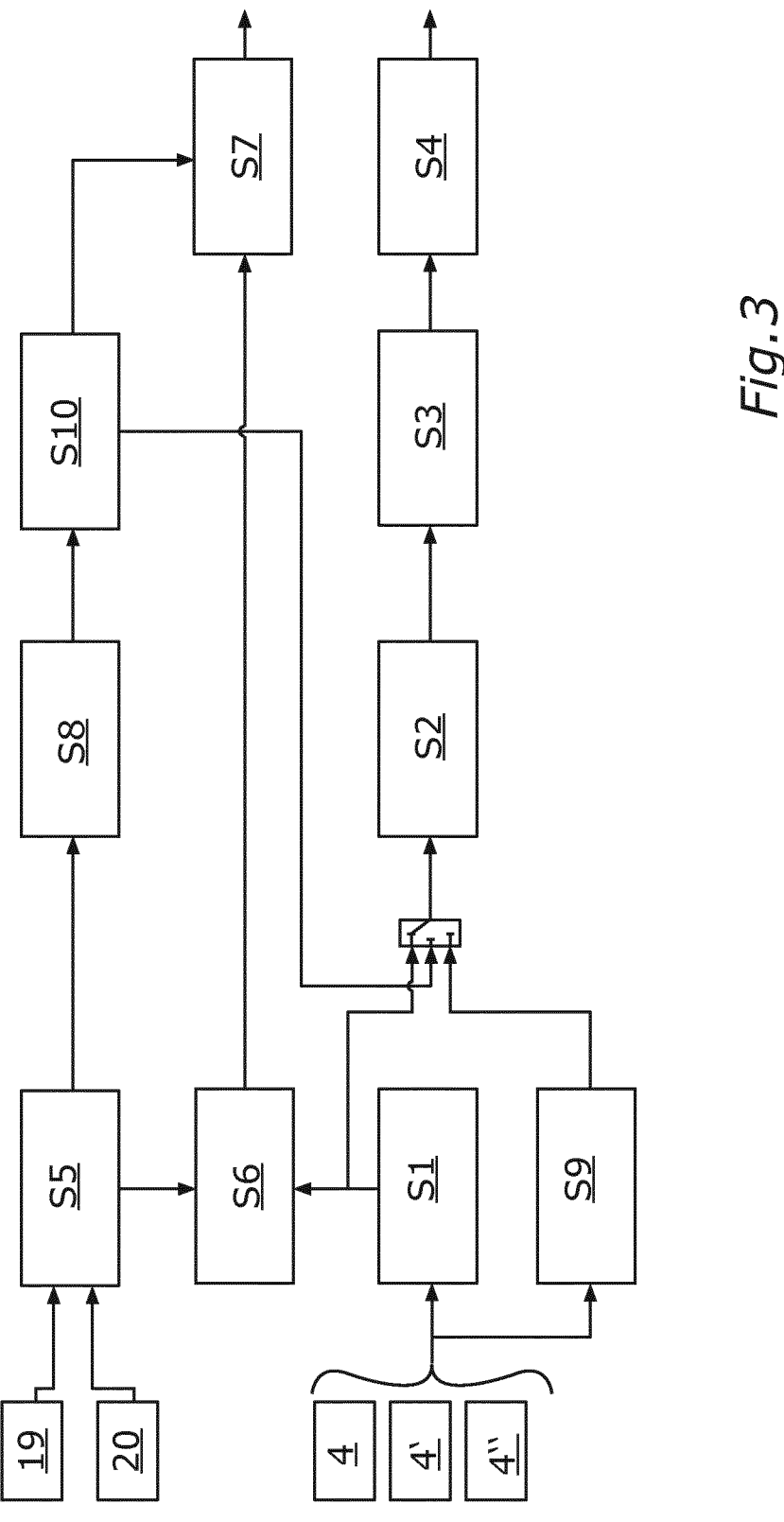
FIG. 3 shows a schematic flowchart for a method for assisting a user in a lateral guidance of the vehicle.

FIG. 3 shows a schematic flowchart for a method for assisting the user in the lateral guidance of the vehicle 1. First, the sensor data from the environment sensor 4, or the camera, are provided. Additionally, other sensor data from other environment sensors 4', 4" can also be provided. The sensor data can also be fused as appropriate. In a step S1, the sensor-based lane profile data 16 are then determined.

Next, in a step S2, the path planning for the vehicle 1 can then be determined. Moreover, in a step S3, control can be performed and, in a step S4, the steering system 10 of the vehicle 1 can be actuated, so that the resultant vehicle movement is obtained.

The high-resolution map data 19 and the satellite-based position data 20 can then be taken as a basis for determining the map-based lane profile data 15 in a step S5. Alternatively or additionally, there may be provision for the path planning, the control and the actuation of the steering system 10 in accordance with steps S2 to S4 to be performed on the basis of the map-based lane profile data 15.

In a step S6, the map-based lane profile data 15 are then compared with the sensor-based lane profile data 16. Depending on the result of the comparison, it can then be decided whether or not the hands-off function is deactivated. In a step S7, the functional or display logic in regard to the hands-off function then ensues. If a difference between the map-based lane profile data 15 and the sensor-based lane profile data 16 is above a predetermined threshold value, the takeover request is output to the user.

Moreover, there is provision for the takeover request to be output to the user in a step S8 on the basis of the respective probabilities of occupancy for the lanes 13*a* to 13*j*. A distance, or a relative situation, of the lane 13*c* with the highest probability of occupancy from, or in relation to, the branch 14 can be taken into consideration here. Also, the highest probability of occupancy can be compared with the probability of occupancy pertaining to the at least one branching lane 13*a*, 13*b*.

In the example of FIG. 2, the lane 13*c* with the highest probability of occupancy is directly adjacent to the exit 14, or the branching lane 13*b*. The probability of occupancy pertaining to the branching lane 13*b*, at 25%, is also close to the highest probability of occupancy of 40%. In this case, a takeover request would therefore be output and the hands-off function deactivated.

In the method schematically illustrated in FIG. 3, step S9 comprises taking the sensor data from the environment sensors 4, 4', 4" as a basis for checking whether there is a preceding vehicle 17. If a preceding vehicle 17 has been detected, the trajectory T taken by the preceding vehicle 17 is also determined. A step S10 also comprises, after the planned deactivation of the hands-off function, on detection of the preceding vehicle 17, requesting trajectory tracking on the basis of the trajectory T taken. In this case, the steering system 10 is then actuated in accordance with steps S2 to S4 on the basis of the trajectory T.

In the example of FIG. 2, there is a preceding vehicle 17, the trajectory T of which can be used for lateral control. It is therefore not necessary to deactivate the hands-off function in this case with unfavorable probabilities of occupancy in the region of the exit 14. The hands-off function remains active and the trajectory T of the preceding vehicle 17 is briefly used for control.

The invention claimed is:

1. A method for assisting a user of a vehicle during an automated lateral guidance of the vehicle on a road having multiple lanes, the method comprising:

receiving satellite-based position data and high-resolution map data;

determining map-based position data that describe a present position of the vehicle in relation to the lanes on a basis of the satellite-based position data and the high-resolution map data;

receiving sensor data from at least one environment sensor of the vehicle, the sensor data describing boundaries of the lanes;

detecting a preceding vehicle and a trajectory taken by the preceding vehicle on a basis of the sensor data;

determining probabilities of occupancy for the vehicle for at least some of the lanes on a basis of the map-based position data and/or the sensor data;

recognizing a branch in the road on a basis of the map-based position data and/or the sensor data, the branch resulting in at least one of the lanes branching off from the other lanes; and actuating an output device for outputting a takeover request before the branch is reached according to the probabilities of occupancy and the trajectory of the preceding vehicle.

2. The method according to claim 1, comprising:

verifying the actuation of the output device for outputting the takeover request on a basis of the trajectory of the preceding vehicle in response to the actuation of the output device being planned on a basis of the probabilities of occupancy.

3. The method according to claim 2, comprising:

performing a path planning for a future lateral guidance of the vehicle on a basis of the trajectory of the preceding vehicle in response to the verification results in the output device not being actuated.

4. The method according to claim 1, comprising:

planning the actuation of the output device for outputting the takeover request according to a situation of a lane with a highest probability of occupancy relative to the branch.

5. The method according to claim 1, comprising:

planning the actuation of the output device for outputting the takeover request according to a comparison of a highest probability of occupancy with a probability of occupancy pertaining to at least one branching lane.

6. A computing device for a driver assistance system of a vehicle, wherein the computing device is configured to:

during an automated lateral guidance of the vehicle:

receive satellite-based position data and high-resolution map data;

determine map-based position data that describes a present position of the vehicle in relation to lanes on a basis of the satellite-based position data and the high-resolution map data;

receive sensor data from at least one environment sensor of the vehicle, the sensor data describing boundaries of the lanes;

detect a preceding vehicle and a trajectory taken by the preceding vehicle on a basis of the sensor data;

determine probabilities of occupancy for the vehicle for at least some of the lanes on a basis of the map-based position data and/or the sensor data;

recognize a branch in the road on a basis of the map-based position data and/or the sensor data, the branch resulting in at least one of the lanes branching off from the other lanes; and actuate an output device for outputting a takeover request before the branch is reached according to the probabilities of occupancy and the trajectory of the preceding vehicle.

7. The computing device according to claim 6, wherein the computing device is configured to:

verify the actuation of the output device for outputting the takeover request on a basis of the trajectory of the preceding vehicle in response to the actuation of the output device being planned on a basis of the probabilities of occupancy.

8. The computing device according to claim 7, wherein the computing device is configured to:

perform a path planning for a future lateral guidance of the vehicle on a basis of the trajectory of the preceding vehicle in response to the verification results in the output device not being actuated.

9. The computing device according to claim 6, wherein the computing device is configured to:

plan the actuation of the output device for outputting the takeover request according to a situation of a lane with a highest probability of occupancy relative to the branch.

10. The computing device according to claim 6, wherein the computing device is configured to:

plan the actuation of the output device for outputting the takeover request according to a comparison of a highest probability of occupancy with a probability of occupancy pertaining to at least one branching lane.

11. A driver assistance system for a vehicle, comprising:

the computing device according to claim 6; and the output device for outputting the takeover request to the user of the vehicle, wherein the driver assistance system is configured for automated lateral guidance of the vehicle.

12. A method for assisting a user of a vehicle during an automated lateral guidance of the vehicle on a road having multiple lanes, the method comprising:

receiving satellite-based position data and high-resolution map data;

determining map-based position data that describe a present position of the vehicle in relation to the lanes on a basis of the satellite-based position data and the high-resolution map data;

receiving sensor data from at least one environment sensor of the vehicle, the sensor data describing boundaries of the lanes;

detecting a preceding vehicle and a trajectory taken by the preceding vehicle on a basis of the sensor data;

determining probabilities of occupancy for the vehicle for at least some of the lanes on a basis of the map-based position data and/or the sensor data;

recognizing a branch in the road on a basis of the map-based position data and/or the sensor data, the branch resulting in at least one of the lanes branching off from the other lanes;

actuating an output device for outputting a takeover request before the branch is reached according to the probabilities of occupancy and the trajectory of the preceding vehicle;

verifying the actuation of the output device for outputting the takeover request on a basis of the trajectory of the preceding vehicle in response to the actuation of the output device being planned on a basis of the probabilities of occupancy; and, performing a path planning for a future lateral guidance of the vehicle on a basis of the trajectory of the preceding vehicle in response to the verification results in the output device not being actuated.

13. The method according to claim 12, comprising:

planning the actuation of the output device for outputting the takeover request according to a situation of a lane with a highest probability of occupancy relative to the branch.

14. The method according to claim 13, comprising:

planning the actuation of the output device for outputting the takeover request according to a comparison of a highest probability of occupancy with a probability of occupancy pertaining to at least one branching lane.

15. A method for assisting a user of a vehicle during an automated lateral guidance of the vehicle on a road having multiple lanes, the method comprising:

receiving satellite-based position data and high-resolution map data;

determining map-based position data that describe a present position of the vehicle in relation to the lanes on a basis of the satellite-based position data and the high-resolution map data;

receiving sensor data from at least one environment sensor of the vehicle, the sensor data describing boundaries of the lanes;

detecting a preceding vehicle and a trajectory taken by the preceding vehicle on a basis of the sensor data;

determining probabilities of occupancy for the vehicle for at least some of the lanes on a basis of the map-based position data and/or the sensor data;

recognizing a branch in the road on a basis of the map-based position data and/or the sensor data, the branch resulting in at least one of the lanes branching off from the other lanes;

actuating an output device for outputting a takeover request before the branch is reached according to the probabilities of occupancy and the trajectory of the preceding vehicle;

planning the actuation of the output device for outputting the takeover request according to a situation of a lane with a highest probability of occupancy relative to the branch; and, planning the actuation of the output device for outputting the takeover request according to a comparison of a highest probability of occupancy with a probability of occupancy pertaining to at least one branching lane.

16. The method according to claim 15, comprising:

verifying the actuation of the output device for outputting the takeover request on a basis of the trajectory of the preceding vehicle in response to the actuation of the output device being planned on a basis of the probabilities of occupancy.

17. The method according to claim 16, comprising:

performing a path planning for a future lateral guidance of the vehicle on a basis of the trajectory of the preceding vehicle in response to the verification results in the output device not being actuated.

\* \* \* \* \*